United States Patent
Stark

(10) Patent No.: US 6,517,097 B1
(45) Date of Patent: Feb. 11, 2003

(54) TOWING DEVICE FOR AN AGRICULTURAL APPARATUS

(75) Inventor: Crister Stark, Väderstad (SE)

(73) Assignee: Vaderstad - Verken AB, Vaderstad (SE)

( * ) Notice: Subject to any disclaimer, the term of this patent is extended or adjusted under 35 U.S.C. 154(b) by 0 days.

(21) Appl. No.: 09/979,082

(22) PCT Filed: May 15, 2000

(86) PCT No.: PCT/SE00/00963

§ 371 (c)(1),
(2), (4) Date: Nov. 16, 2001

(87) PCT Pub. No.: WO00/73123

PCT Pub. Date: Dec. 7, 2000

(30) Foreign Application Priority Data

May 17, 1999 (SE) ................................................ 9901799

(51) Int. Cl.[7] ........................ B62D 13/00; A01D 34/30; A01C 5/00
(52) U.S. Cl. .................... 280/442; 280/455.1; 280/457; 56/218; 111/14
(58) Field of Search ................................ 280/442, 492, 280/455.1, 457, 459; 56/218; 711/14, 924; 172/677

(56) References Cited

U.S. PATENT DOCUMENTS

| | | | | |
|---|---|---|---|---|
| 1,832,641 A | * | 11/1931 | Laramee | 280/457 |
| 2,545,119 A | * | 3/1951 | Stratton et al. | 280/442 |
| 4,582,337 A | * | 4/1986 | Hsueh | 280/455.1 |
| 5,171,025 A | * | 12/1992 | Brown | 280/442 |
| 5,947,502 A | * | 9/1999 | Kamerzell et al. | 280/442 |
| 6,402,177 B1 | * | 6/2002 | Carmona et al. | 280/442 |

FOREIGN PATENT DOCUMENTS

| | | |
|---|---|---|
| DE | 195 31 172 | 3/1996 |
| EP | 0 085 146 | 8/1983 |
| EP | 0 122 527 | 10/1984 |
| EP | 0 350 008 | 1/1990 |
| EP | 0 925 963 | 6/1999 |
| FR | 77 24279 | 3/1979 |
| WO | WO 99/21405 | 5/1999 |

* cited by examiner

*Primary Examiner*—Lesley D. Morris
*Assistant Examiner*—Matthew Luby
(74) *Attorney, Agent, or Firm*—Young & Thompson

(57) ABSTRACT

A towing device for an agricultural apparatus (2), includes at least one wheel (6) which is arranged in a front area of the agricultural apparatus (2) and can rotate about an essentially horizontal wheel axle (8); a link arm (10) which is connected to the wheel axle (8) and is coupled in an articulated manner to a frame (4) arranged on the agricultural apparatus 92) about an essentially vertical first axis (12); and a draw bar (14) which can be coupled to a towing vehicle. A control member (22) is arranged between the draw bar (14) and the frame (4) in order to control the pivoting of the link arm (10) about the first axis (12) as the towing vehicle turns, so that the agricultural apparatus (2) turns at least less than the towing vehicle.

6 Claims, 4 Drawing Sheets

TOWING DEVICE FOR AN AGRICULTURAL APPARATUS

Figure 1:
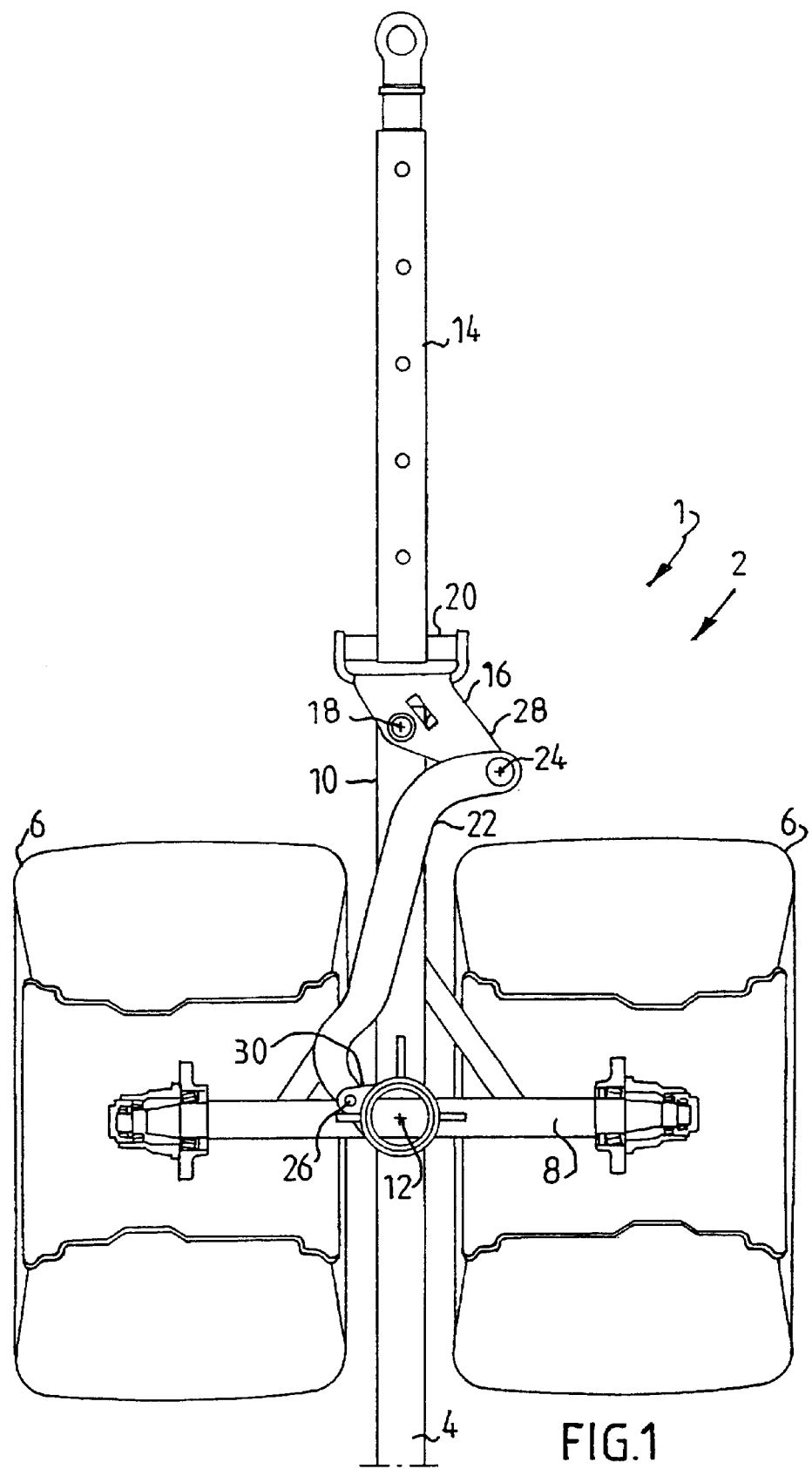

The present invention relates to a towing device for an agricultural apparatus, comprising at least one wheel which is arranged in a front area of the agricultural apparatus and can rotate about an essentially horizontal wheel axle; a link arm which is connected to the wheel axle and is coupled in an articulated manner to a frame arranged on the agricultural apparatus about an essentially vertical first axis; and a draw bar which can be coupled to a towing vehicle.

Large agricultural apparatuses must be provided with more than one wheel axle so that the weight of the apparatus can be distributed over a greater surface area on the ground. An agricultural apparatus with more than one wheel axle and towed by a towing vehicle is more difficult to handle than an agricultural apparatus which is only provided with one wheel axle. A multi-axle agricultural apparatus has a tendency to make sharp turns behind the towing vehicle when the towing vehicle turns, which means that the towing vehicle has to widen the turns and turn with a large turning radius if the towing vehicle and the towed agricultural apparatus are to avoid an obstacle. This has meant that the turning areas in a field tend to be considerably larger compared with an agricultural apparatus which is only provided with one wheel axle. It is also more difficult to reverse with a multi-axle agricultural apparatus compared with a single-axle agricultural apparatus.

There are often narrow passages and obstacles on fields, which increase the requirement for smooth handling of an agricultural apparatus. The driver is forced to drive the towing vehicle back and forth in order to get into the desired position when working of the soil is to begin, leading to unwanted compression of the soil. Since work with agricultural apparatuses is often done under time constraints, the work with a multi-axle agricultural apparatus is extremely demanding on the driver.

The object of the present invention is to increase the manoeuvrability of an agricultural apparatus which is provided with a number of wheel axles, so that the towing vehicle can make sharp turns with a small turning radius without the agricultural apparatus also making excessively sharp turns.

This is achieved using an agricultural apparatus of the type set out in the introduction, in which a control member is arranged between the draw bar and the frame in order to control the pivoting of the link arm about the first axis as the towing vehicle turns, so that the agricultural apparatus turns at least less than the towing vehicle.

With such a towing device, the agricultural apparatus is easy to manoeuvre with the aid of the towing vehicle. The turning areas can be made small, and it is easy to bring the agricultural apparatus to the desired position when cultivation is to begin. It is also easy to reverse the agricultural apparatus since the controlled pivoting of the link arm about the first axis means that the towing vehicle and the agricultural apparatus do not move towards each other.

Figure 2:
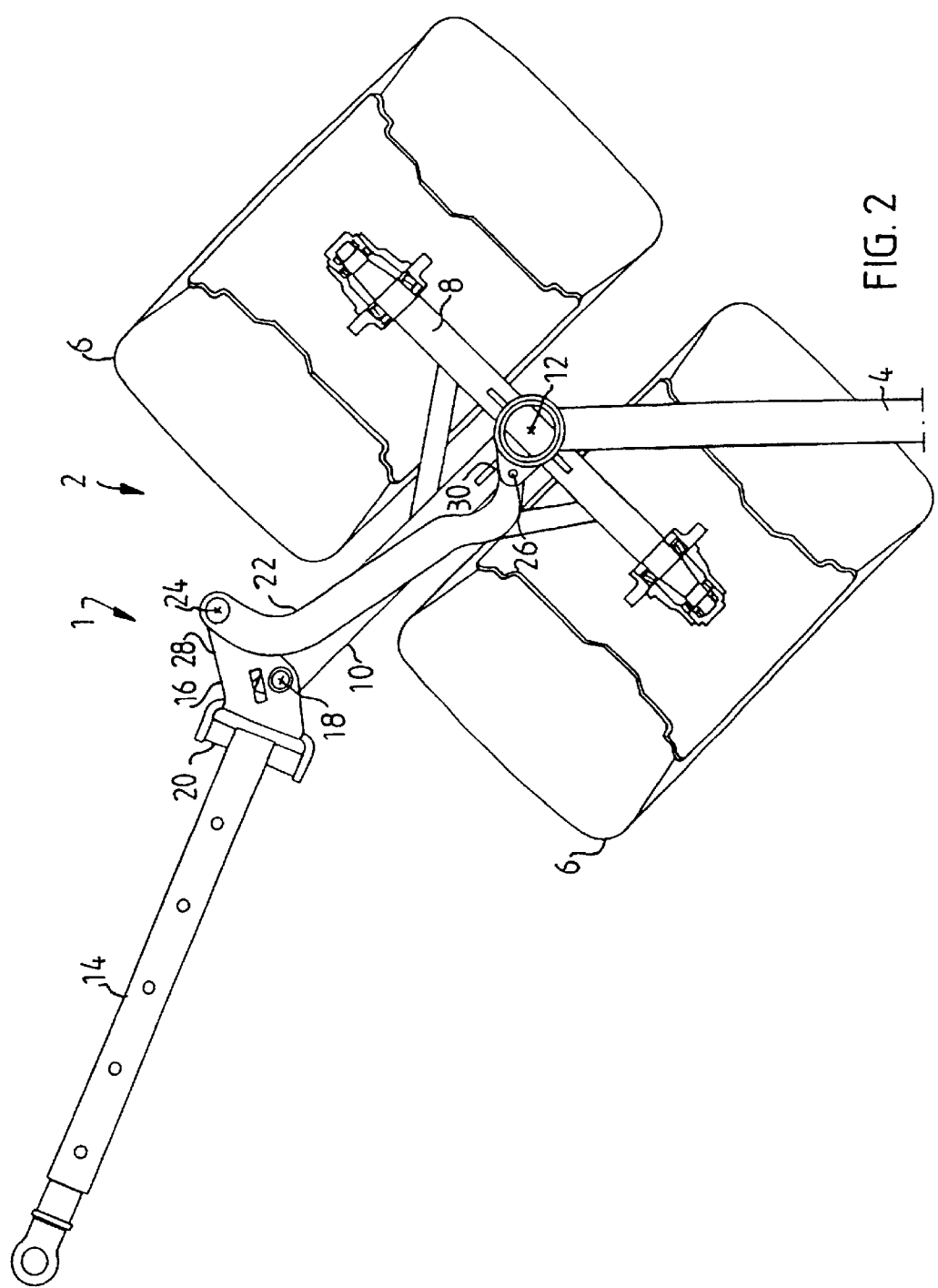
Figure 3:
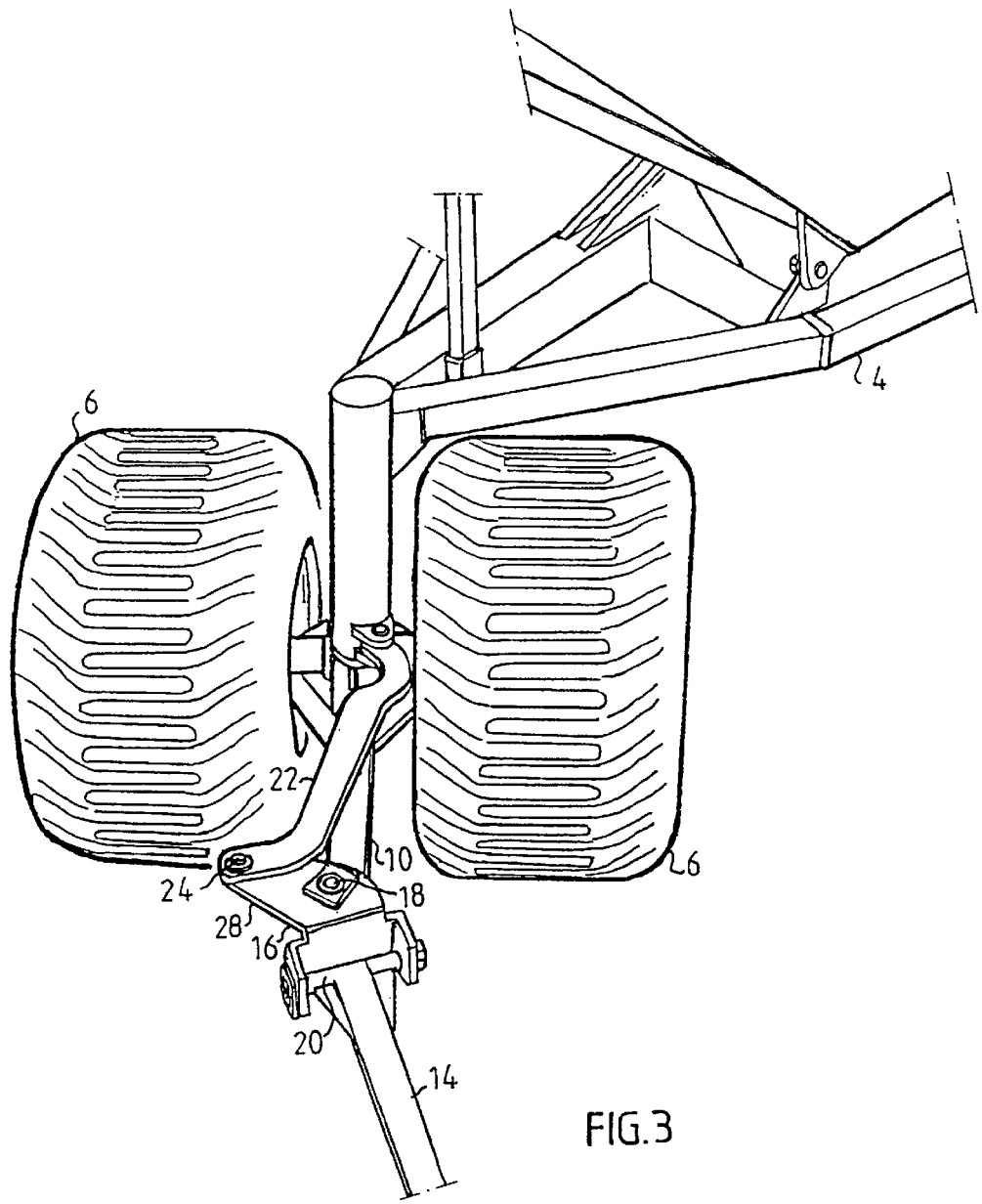
Figure 4:
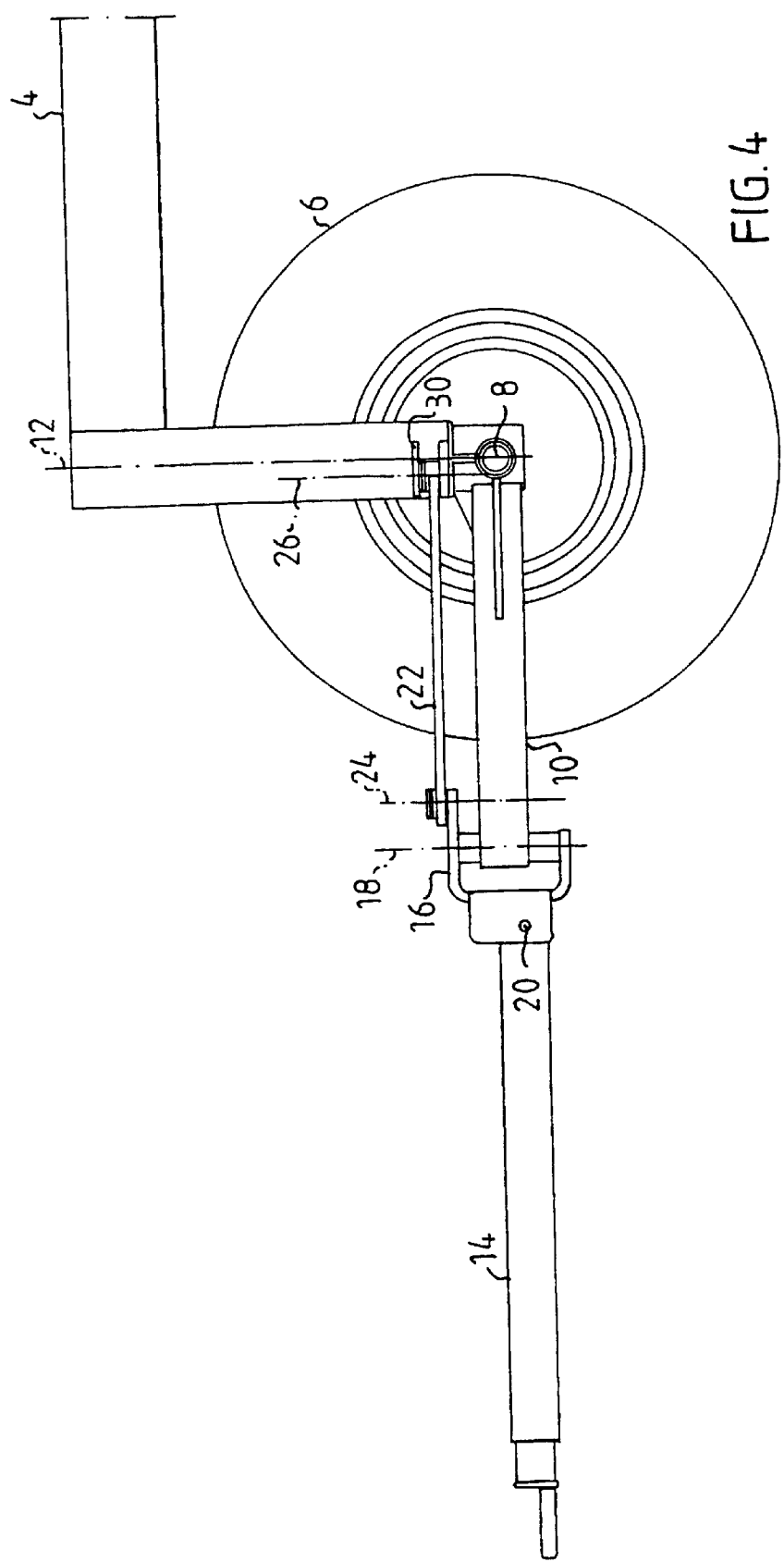

The invention will be described in more detail below with reference to an illustrative embodiment shown on the attached drawings, in which FIG. 1 shows a plan view of a towing device for an agricultural apparatus according to the present invention, in a position in which the agricultural apparatus is being driven straight forwards, FIG. 2 shows a plan view of the towing device according to FIG. 1, in a position in which the agricultural apparatus is turning to the left, FIG. 3 shows a perspective view of the towing device according to FIG. 2, in which the agricultural apparatus is turning to the left, and FIG. 4 shows a side view of the towing device according to FIG. 1.

A plan view of a towing device 1 for an agricultural apparatus 2 according to the present invention is shown in FIG. 1. The towing device 1 is set in a position in which the agricultural apparatus 2 will be driven straight forwards. The agricultural apparatus 2 can be, for example, a sowing apparatus, harrow, ring roller or the like, which is known per se and will therefore not be described here. The agricultural apparatus 2 comprises a frame 4 which at a front end is provided with two wheels 6. There are also wheels (not shown in the figure) at the middle and/or back area of the agricultural apparatus 2. The purpose of the wheels 6 is to support the apparatus 2 so that the latter can be driven across fields for cultivation and can be driven on roads when being transported. Large and heavy agricultural apparatuses 2 require a number of wheels 6 arranged on a number of wheel axles so that the weight of the agricultural apparatus 2 can be distributed over a large surface area on the ground.

In the illustrative embodiment shown in FIG. 1, two wheels 6 are arranged to rotate on an essentially horizontal wheel axle 8 which is in turn connected to a link arm 10, which is articulated on the frame 4 about an essentially vertical first axis 12. This means that when the link arm 10 pivots about the first axis 12, the wheels 6 will turn in relation to the frame 4 of the agricultural apparatus 2. The link arm 10 is preferably essentially at right angles to the wheel axle 8. As is shown in FIG. 1, the first axis 12 intersects the wheel axle 8, which means that the centre of turning of the wheels 6 lies between the two wheels 6. The link arm 10 extends between the wheels 6. It is possible, however, to arrange the wheel axle 8 at another place along the link arm 10.

The link arm 10 and thus the wheels 6 pivot about the first axis 12 when the towing vehicle, such as a tractor (not shown), turns, for example in order to turn round or to avoid an obstacle. The agricultural apparatus 2 can be coupled to the towing vehicle with the aid of a draw bar 14 which is connected to the link arm 10 via a coupling element 16.

The coupling element 16 is articulated on the link arm 10 about a second essentially vertical axis 18. The draw bar 14 is connected to the coupling element 16 via a hinge 20, which only allows the draw bar 14 to pivot upwards and downwards in relation to the coupling element 16. When the draw bar 14 is pivoted to the right or left, the coupling element 16 will follow the movement of the draw bar 14.

The towing device 1 comprises a control member 22 which, about a third essentially vertical axis 24, is articulated on the coupling element 16, and, about a fourth essentially vertical axis 26, is articulated on the frame 4 of the agricultural apparatus 2. The control member 22 controls the pivoting of the link arm 10 about the first axis 12 when the towing vehicle turns, so that the wheels 6 are understeered in relation to the turning of the towing vehicle. Thus, the agricultural apparatus 2 does not turn to the same extent as the towing vehicle, which means that the agricultural apparatus 2 will widen the turn. It is therefore easier to manoeuvre the agricultural apparatus 2 on fields and during transportation of the agricultural apparatus 2 on roads. The second and third axes 18, 24 are preferably parallel and arranged at a distance from each other. This is achieved with a projection 28 which is arranged on the coupling element 16 and on which the control member 22 is arranged in an articulated manner about the third axis 24. Arranged on the frame 4 there are two lugs 30 on which the control member 22 is connected in an articulated manner about the fourth axis 26.

FIG. 2 shows a plan view of the towing device 1 according to FIG. 1, in a position in which the agricultural apparatus 2 is turning to the left. The towing vehicle will pivot the link arm 10 about the first axis 12 via the draw bar 14 and the coupling element 16, so that the wheels 6 will turn in the direction in which the towing vehicle turns. However, the control member 22 will limit the pivoting of the link arm 10 about the first axis 12, so that the wheels 6 and thus the agricultural apparatus 2 will turn less than the towing vehicle.

FIG. 3 shows a perspective view of the towing device 1 according to FIG. 2, in which the agricultural apparatus is turning to the left. It will be clearly seen here how the link arm 10 is articulated on the frame 4 of the agricultural apparatus 2. The first essentially vertical axis 12 extends above the periphery of the wheels 6, so that the wheels 6 pass freely under the frame 4 of the agricultural apparatus 2 as the wheels 6 turn.

A side view of the towing device 1 according to the invention is shown in FIG. 4. This figure also shows that the first axis 12 extends above the periphery of the wheels 6.

It is conceivable for the control member 22 to be adjustable so that the length of the control member 22 can be changed, or the control member 22 can be made with a number of holes which allow said control member 22 to be arranged at different positions (not shown) on the third or fourth axis 24, 26. This means that the understeering of the towing device I can be varied.

It is also possible to arrange two towing devices 1 on the agricultural apparatus 2. For the towing devices 1 to cooperate with each other; a parallel bar can be arranged between the link arms 10 of each towing device 1 (not shown). The figures show two wheels 6 arranged on the wheel axle 8. However, it is possible for one, three or four wheels 6 to be arranged on the wheel axle 8. The coupling element 16 can be made in one piece with the draw bar 14.

What is claimed is:

1. Towing device for an agricultural apparatus (2), comprising at least one wheel (6) which is arranged in a front area of the agricultural apparatus (2) and can rotate about an essentially horizontal wheel axle (8); a link arm (10) which is connected to the wheel axle (8) and is coupled in an articulated manner to a frame (4) arranged on the agricultural apparatus (2) about an essentially vertical first axis (12); and a draw bar (14) which can be coupled to a towing vehicle, characterized in that a control member (22) is arranged to control the pivoting of the link arm (10) about the first axis (12) as the towing vehicle turns, so that the agricultural apparatus (2) turns at least less than the towing vehicle; in that a coupling element (16) is coupled in an articulated manner on the link arm (10) about a second essentially vertical axis (18); in that the control member (22) is coupled in an articulated manner on the coupling element (16) about a third essentially vertical axis (24), and in that the control member (22) is coupled in an articulated manner on the frame (4) of the agricultural apparatus (2) about a fourth essentially vertical axis (26), so that the control member (22) controls the pivoting of the link arm (10) about the first axis (12) as the towing vehicle turns; and in that the draw bar (14) is connected to the coupling element (16).

2. Towing device according to claim 1, characterized in that the link arm (10) is essentially at right angles to the wheel axle (8).

3. Towing device according to claim 1, characterized in that two wheels (6) are arranged on the wheel axle (8), and in that the link arm (10) extends between the wheels (6).

4. Towing device according to claim 1, characterized in that the first axis (12) intersects the wheel axle (8).

5. Towing device according to claim 1, characterized in that the control member (22) comprises a rod.

6. Towing device according to claim 1, characterized in that two towing devices (1) are arranged on the agricultural apparatus (2), and in that a parallel bar is arranged between the link arms (10) of each towing device (1).

* * * * *